Feb. 18, 1941.  K. SCHÄFER  2,232,344
DOOR FOR MOTOR VEHICLES
Filed April 18, 1938  2 Sheets-Sheet 1
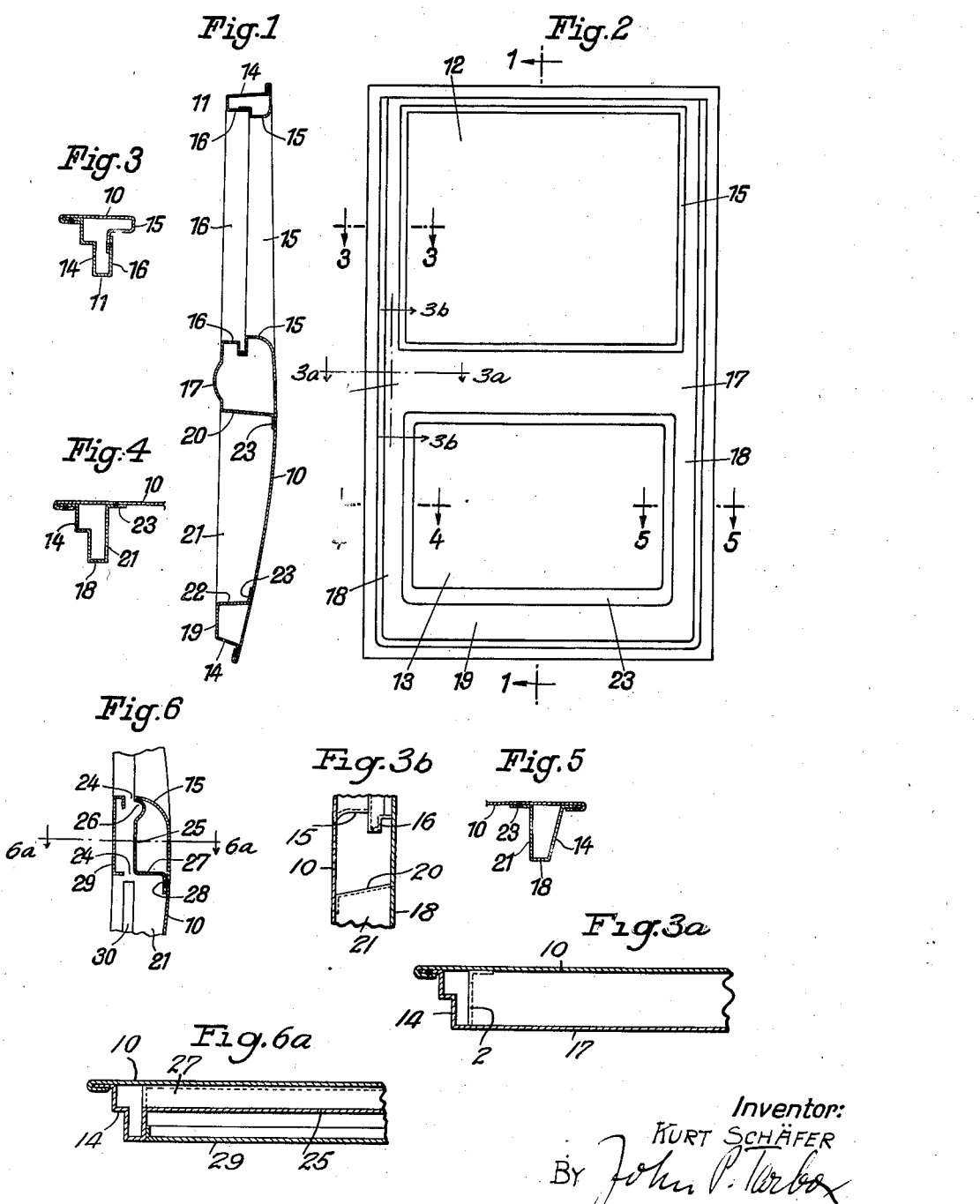
Inventor:
KURT SCHÄFER
By John P. Tarbox
ATTORNEY Feb. 18, 1941.   K. SCHÄFER   2,232,344
DOOR FOR MOTOR VEHICLES
Filed April 18, 1938   2 Sheets-Sheet 2

Inventor:
KURT SCHÄFER
By John P. Tarbu
ATTORNEY

Patented Feb. 18, 1941

2,232,344

UNITED STATES PATENT OFFICE 2,232,344

DOOR FOR MOTOR VEHICLES

Kurt Schäfer, Berlin-Fichkamp, Germany, assignor to Edward G. Budd Manufacturing Company, Philadelphia, Pa.

Application April 18, 1938, Serial No. 202,667
In Germany April 17, 1938

5 Claims. (Cl. 296—44)

(Granted under the provisions of sec. 14, act of
March 2, 1927; 357 O. G. 5)

This invention relates to a door for motor vehicles.

It is the object of the invention to provide a door for motor vehicles which is very rigid and robust in construction, safe against distortion, easy to produce and of a relatively low weight. With this object in view my novel door comprises, apart from the lateral and top ledges forming the frame of the door-window, box-shaped door ledges passing from end to end below the door window and near the edges of the door portion below the door window. The inner edges of said box-shaped ledges are secured to the external wall or shell of the door in such a manner that the said lower portion of the door forms a light and rigid body which is safe against distortion, twisting or warping. Preferably the outer covering plate of the door and the inner parts connected therewith are arranged to form a closed box girder below the window which is connected with the vertical box girder or girders.

According to a further feature of the invention, a box girder may be arranged below the window aperture, at the inner side of the gap or slot for the reception and passage of the adjustable window. This box girder is connected to the lateral box girders and forms the support for the lock, the window motion and the like at the same time. The inner covering plate of the door is preferably formed with a second aperture arranged below the window aperture and having about the same size as the window aperture, whereby flanges connected with the outer covering plate and forming one wall of the various interconnected box girders extend from the marginal portions of said second aperture substantially at right angles to the inner covering plate.

According to a further feature of the invention the box-shaped window frame is formed integral with the box-shaped frame of the lower door portion. The portions of the integral box girders in the upper and lower portion of the door preferably have substantially similar cross sections.

Figure 7:
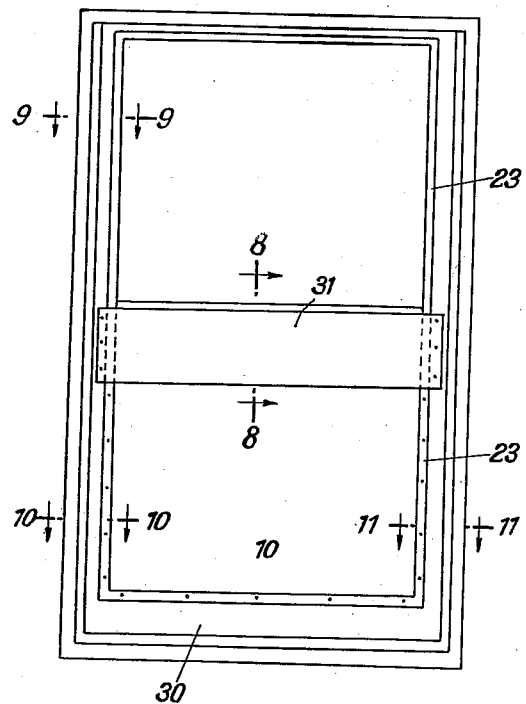
Figure 8:
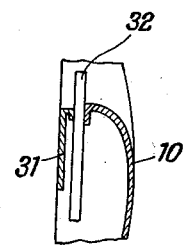

The invention will be better understood by reference to the following detailed description in connection with the accompanying drawings, showing by way of example and diagrammatically some embodiments of the invention, viz:

Fig. 1 is a vertical section on line 1—1 in Fig. 2 through the door of a motor vehicle having the invention applied thereto, Fig. 2 is a view of the inner side of the door shown in Fig. 1, Figs. 3, 3a, 3b, 4 and 5 are sections on lines 3—3, 3a—3a, 3b—3b, 4—4, or 5—5 respectively in Fig. 2, Fig. 6 is a vertical section below the door aperture (corresponding to the middle portion of Fig. 1) of a modified form of a door, Figure 6a is a section similar to Figure 3a taken along 6a—6a of Figure 6, Fig. 7 is a view of the inner side of another modification, Figs. 8 to 11 are sections on lines 8—8, 9—9, 10—10 or 11—11 respectively of Fig. 7.

Referring now to the drawings in greater detail and first to Figs. 1 to 5, there are shown an outer covering plate 10 and an inner covering plate 11 both of which are preferably formed as pressed sheet metal platings. Provided in both parts is a window aperture 12 while a further aperture 13 of a similar size is provided in the inner plating only. Flanges 14 directed to the outside and forming the stop faces of the door are provided in a manner known per se along the inner plating 11 and connected in usual manner by means of small bent portions with the outer plating 10. The outer and inner walls 10 and 11 are provided with flanges 15 and 16 directed towards each other and connected with each other, forming the window frame and preferably also the window guides or a part thereof.

The portions 17, 18, 19 of the interior plating bordering the lower aperture 13 are formed with outwardly directed flanges 20, 21, 22 the bent portions 23 of which are secured to the outer plating 10 preferably by spot-welding.

In the embodiment shown in Figs. 1 to 5 a closed box girder extends around the door and imparts to the same a very good rigidity against distortion, twisting and hanging down. The door is additionally reinforced by the box-shaped intermediate girder 10, 15, 16, 17, 20, 23 arranged below the window aperture.

The door shown in Figs. 1 to 5 is provided to receive a fixedly mounted window or a vertically subdivided window comprising two horizontally slidable parts, while Fig. 6 shows a modification in which a slot 24 for a vertically movable window is provided below the window aperture.

The gap 24 is defined at the outside by a part 25 extending across the width of the door and connected by a flange 26 with the flange 15 of the outer plating forming the window frame and along its lower edge by an outwardly directed flange 27 and a bent-over portion 28 with the surface of the outer plating, in a similar manner as the flange 20 and its bent portion 23 in the first embodiment. Thus also in this case a box girder is formed below the window aperture.

The inner side of the slot 24 is covered by a usual lock plate 29 which, however, may be constructed as a closed box girder by a connection with other parts, so that in this case two parallel box girders separated by the gap 24 would be formed below the window aperture.

The part 25 or the part 29 are preferably formed as an integral pressed piece with the inner wall 11 of the whole door. Provided at the wall 21 of the vertical door edge below the parts 25 and 29 is a U-box 30, serving as a window guide in usual manner.

In order to connect the bent portions 23 or 26 and 28 with the respective portions of the outer opening plating which are visible, indirect spot welding is preferably used, applying a spot electrode to the inside only, while the second pole is connected to the material spaced from the spot electrode and the counter-pressure is taken up by a support which is not connected to the source of welding current.

In Figs. 7 to 9 there is again shown the outer plating 10 of a door and a box-shaped frame 30 connected with the outer plating by welding or the like.

Figure 9:
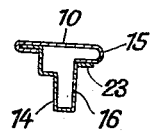
Figure 10:
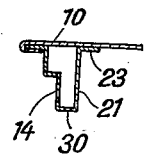
Figure 11:
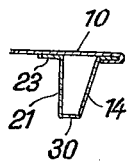

The flange 23 is directly connected to the integral outer wall 10 in the lower door portion (Figs. 10 and 11), in the same manner as in the first embodiment. In the upper door portion, the outer plating in order to form a window guiding groove, is inwardly bent and then bent again parallelly to the outer wall. This bending 15 is provided beside the door aperture only and the flange 23 according to Fig. 9 is secured to this bent portion only contrary to the constuction shown in Fig. 3. Below the window aperture (Figs. 10 and 11) the flange 23 passes over from the position of its upper portion to the position of its lower portion. 31 is a cover plate below the window aperture, behind which the window 32 can be upwardly and downwardly moved and which serves to carry the crank device (window motion), the lock and the like.

It will thus be understood that the box-shaped frame 30 of the window passes over without interruption into the box-shaped frame of the lower door portion while the flanges 16, 21 (Figs. 9–11) pass from end to end without interruption along the whole inside of the box 30 and are connected with the outer plating 10.

While I have herein shown and described certain preferred embodiments of my invention I wish it to be understood that I do not confine myself to all the precise details herein set forth by way of illustration, as modification and variation may be made without departing from the spirit of the invention or exceeding the scope of the appended claims.

More particularly, the feature that the vertical edges or at least the vertical edge at the hinge side of the door is formed as a closed box girder is of a primary importance while the box-shaped construction of the lower edge which is not stressed so much is less important or at least important only in order to produce a frame of closed box girders surrounding or bordering the whole door.

My novel door can be made of sheet metal or other material. In the drawing a door of rectangular form has been shown, but the same arrangement may be used in a modern door which has irregular shapes and in which the lateral box girders are no more accurately vertical.

I claim:

1. In a vehicle door having a window opening in its upper part, a panel forming the outer surface of the door below said window opening and having an extension extending along one side of said window opening, an inner member extending over substantially the entire height of said door, said member comprising a web shaped portion being arranged transversely to the plane of said panel and being rigidly connected along one of its edges to one side edge of said panel and of said panel extension, a second web shaped portion being arranged substantially parallel to, but spaced from said first named portion toward the middle of the door, said second portion being rigidly connected beneath the window opening along one of its edges to the interior surface of said panel and at the side of the window opening to an inwardly bent-off portion of said panel extension, and a third web shaped portion being arranged substantially parallel to, but spaced from said panel and panel extension connecting the inner edges of said first and second portion, said three portions of said member, said panel, and panel extension forming together a box sectional door rail being completely closed substantially over its entire length, and affording great torsion stiffness over substantially the entire height of the door.

2. In a vehicle door having rails along its both upstanding sides and a window pane adapted to be lowered into the lower part of the door between said rails, a substantially horizontally extending completely closed box sectional third rail having one wall formed by the outer panel of the door and being arranged along the upper margin of the lower part of the door completely on the outer side of the path of said window pane, said third rail extending between and being connected to said first-named rails so as to give the door high strength against torsion, bending and sagging.

3. In a vehicle door according to claim 1, an elongated member substantially U-shaped in cross section, this member being arranged substantially horizontal, having the edges of its free arms rigidly connected to the inner surface of said panel and one of its ends being connected to said second web shaped portion, said inner member and said elongated member forming together with said panel a vertically and horizontally extending structure of completely closed box sectional rails of great resistance against torsion and bending.

4. In a vehicle door according to claim 1, said second web shaped portion overlapping a part of the inner surface of said panel by means of a marginal flange and being connected thereto by welds which are invisible on the outer surface of the panel.

5. In a vehicle door having rails along its both upstanding sides and a window panel adapted to be lowered into the lower part of the door between said rails, a substantially horizontally extending hollow section third rail having its outer wall formed by the outer panel of the door and being arranged along the upper margin of the lower part of the door in the region of the window panel completely on the outer side of the path of the latter, said third rail extending between and having its ends connected to said first-named rails so as to increase materially the strength of the door.

KURT SCHÄFER.